United States Patent [19]
Sezan et al.

[11] Patent Number: 5,579,054
[45] Date of Patent: Nov. 26, 1996

[54] SYSTEM AND METHOD FOR CREATING HIGH-QUALITY STILLS FROM INTERLACED VIDEO

[75] Inventors: M. Ibrahim Sezan, Rochester, N.Y.; Andrew J. Patti, Palo Alto, Calif.

[73] Assignee: Eastman Kodak Company, Rochester, N.Y.

[21] Appl. No.: 426,309

[22] Filed: Apr. 21, 1995

[51] Int. Cl.$^6$ .................................................. H04N 7/01
[52] U.S. Cl. ............................................ 348/452; 348/559
[58] Field of Search ................................ 348/441, 448–452, 348/559; H04N 7/01, 7/00

[56] References Cited

U.S. PATENT DOCUMENTS

| | | | |
|---|---|---|---|
| 4,472,732 | 9/1984 | Bennett et al. | 358/22 |
| 4,785,351 | 11/1988 | Ishikawa | 358/140 |
| 5,021,870 | 6/1991 | Motoe et al. | 358/11 |
| 5,134,480 | 7/1992 | Wang et al. | 358/140 |
| 5,410,356 | 4/1995 | Kikuchi et al. | 348/452 |

FOREIGN PATENT DOCUMENTS 0110997  4/1993  Japan ........................ H04N 7/01

OTHER PUBLICATIONS

J. R. Bergen, P. J. Burt, R. Hingorani, S. Peleg, "A Three-Frame Algorithm for Estimating Two-Component Image Motion", IEEE Transactions On Pattern Analysis and Machine Intelligence, vol. 14, No. 9, Sep. 1992, pp. 886–896.

M. A. Isnardi, "Modeling the Television Process", Technical Report 515, May 1986, Massachusetts Institute of Technology, pp. 161–163.

J. S. Lim, "Two-Dimensional Signal and Image Processing", Massachusetts Institute of Technology, published by Prentice Hall, pp. 607–609.

*Primary Examiner*—David E. Harvey
*Attorney, Agent, or Firm*—Thomas H. Close

[57] ABSTRACT

A system and method for creating a high quality still image from a series of interlaced video fields of the type employing local motion detection between first and third fields of the series, merging the first and second fields in areas of no motion and performing spatial interpolation on the first field in areas containing local motion, including removing dominant motion from the second and third fields prior to local motion detection.

10 Claims, 4 Drawing Sheets

1

SYSTEM AND METHOD FOR CREATING HIGH-QUALITY STILLS FROM INTERLACED VIDEO

The disclosure in the microfiche appendix contains material to which a claim of copyright protection is made. The copyright owner has no objection to the facsimile reproduction of any one of the patent documents or the patent disclosure as it appears in the U.S. Patent and Trademark Office patent file or records, but reserves all other rights whatsoever.

FIELD OF THE INVENTION

This invention relates to a method and system for obtaining a high quality still image from multiple fields of an interlaced video signal, i.e., deinterlacing, in the presence of both dominant motion, such as camera zoom, rotation, pan, or jitter, and local motion of independently moving objects.

BACKGROUND OF THE INVENTION

The recent availability of video frame grabbing hardware has allowed video signals to appear on a variety of new platforms, such as multi-media computers and video printing systems. These new platforms have generated a desire in the user to view and print video signals in a different mode than was originally intended, namely as still images. The interlaced video standard, while being sufficient for displaying moving pictures at satisfactory quality, is ineffective for displaying stills since only one half the information needed to display an image is acquired at a single time. As a result, video must be deinterlaced, i.e., converted to progressive video, before it can be viewed as a sequence of stills. The deinterlacing process, which refers to forming frames from fields, is complicated by the possibility that motion can change the scene contents from field to field. Relative motion between fields can be caused by movement of objects in the scene relative to the camera, or by camera changes such as pan, zoom and jitter, where the latter is rather common in hand-held consumer camcorders.

The prior art addresses the problem of deinterlacing an even (or an odd) field by estimating the missing odd (or even) lines. A well-known method is to merge the even and odd fields, i.e., to fill in the missing lines of the odd (even) field by the lines of the neighboring even (odd) field. This simple mechanism, causes spatial "judder" artifacts at those image regions that contain moving objects (objects that move within the time interval of two successive fields). Merging, however, provides the best spatial resolution at steady image regions. Another approach to deinterlacing is to concentrate on a single field only (e.g., the odd field) and interpolate the missing lines using spatial interpolation. A simple interpolation technique is vertical linear interpolation where an average of the available pixel values above and below the missing pixel is assigned to the missing pixel. This method may cause artifacts if the missing pixel is over an edge whose orientation is not vertical. To overcome these artifacts, an contour-sensitive spatial interpolation method is proposed in M. Isnardi, "Modeling the Television Process," Technical Report No. 515, Massachusetts Institute of Technology, 1986, pages 161 to 163. This method attempts to find the orientation of the image gradient at the missing pixel. Interpolation is then performed using image values that are along this orientation in order not to "cross an edge" and cause artifacts.

A method that is potentially more effective is a hybrid method where the deinterlacing process switches, on a pixel-by-pixel basis, between merging and spatial interpolation depending on the dynamics of the missing pixel, so that the advantages of merging in steady regions are fully maintained. A motion detection scheme should be used to classify the missing pixel as a "moving pixel" or "steady pixel".

In U.S. Pat. No. 4,472,732, issued Sep. 18, 1984, Bennett et al. disclose such a method that uses the pixel-by-pixel difference of neighboring fields with the same polarity (e.g., even fields) that follow and precede the field that will be deinterlaced (e.g., an odd field) to perform motion detection, and then switch between merging and vertical interpolation depending on the presence and absence of motion that is determined by thresholding the difference values. This particular approach may falsely detect "no motion" if the scene is such that the gray levels of the pixels being compared in the two neighboring fields are similar although there is motion in the scene. Such a situation may happen, for instance, in case of scenes that contain a small object 10 moving against a uniform background 12 in the direction of arrow A as shown in FIG. 1., where fields (k), (k+1), and (k+2) represent successive interlaced video fields. In this case, merging of the fields (k) and (k+1) at a region of interest denoted as the box 14, will result in artifacts due to a false classification of no motion between field (k) and (k+2). If a consecutive fourth field, field (k+3) in FIG. 1, is used in motion detection, a comparison of fields (k+1) and (k+3), in addition to the comparison of fields at times (k) and (k+2), may increase the reliability of motion detection. This is evident in the example shown in FIG. 1, where a "moving" decision can be rendered for the region of interest in the frame at time (k+1) as a result of comparing the corresponding image values at fields at times (k+1) and (k+3). Motion-detection based deinterlacing techniques that utilize four consecutive fields, and switch between spatial interpolation and merging, have been discussed in U.S. Pat. No. 4,785,351, issued to Ishikawa, Nov. 15, 1988, and in U.S. Pat. No. 5,021,870 issued to Motoe et al, Jun. 4, 1991.

These techniques that adapt themselves to the presence of motion are not effective in producing a high quality still image in case of video images that contain dominant motion between fields. In such cases, the above techniques will default to spatial interpolation only, and thus no additional improvement in resolution will be obtained. Video images with dominant motion result, for example, from the motion of hand-held cameras and/or cameras that are panned and zoomed. Since hand-held video cameras are becoming increasingly common in consumer applications, there is a growing interest in a deinterlacing method (e.g., to be used in generating good-quality prints from video) that improves the resolution via motion compensated temporal interpolation, using information contained in neighboring fields.

A motion-compensated deinterlacing technique that accounts for dominant motion between fields is discussed by Wang et al. in U.S. Pat. No. 5,134,480, issued Jul. 28, 1992. The technique proposed by Wang et al is a time-recursive method that performs motion estimation and compensation on a local basis (for each pixel) via block matching. Due to the time-recursive nature of the method, a history of the deinterlaced versions of the fields that precede the field of interest is utilized. A quad-tree hierarchy is used in adjusting the block size in order to increase the accuracy of local motion estimation. Deinterlacing is implemented by linearly blending the results of spatial vertical interpolation and motion compensated interpolation, where motion compensation is performed using either the future field following the field of interest or the recursively deinterlaced version of the previous field.

Local motion estimation for every pixel location is in general computationally expensive. Further, it is complicated by the existence of covered/uncovered regions (i.e., occlusions), and sharply varying motion vectors at boundaries of objects that move independent of each other. The challenge for robustness in the case of methods that estimate local motion, thus allowing for independent object motions, is not to create artifacts at motion boundaries. This problem is very difficult to solve in a robust manner without an excessive amount of processing, and is especially difficult in creating high-quality stills from video, since small artifacts can be extremely objectionable. When the motion is modeled globally, using models such as affine or perspective, the challenge is not to produce artifacts when the actual motion deviates from the model.

SUMMARY OF THE INVENTION

The object of this invention is to provide a robust method that combines global motion compensation and motion adaptation for deinterlacing in the presence of both dominant motion, such as camera zoom, pan, or jitter, as well as independent local object motion, in order to create a high-quality still image from interlaced video.

Briefly summarized, the object is achieved according to one aspect of the present invention, by providing a system and a method for creating a high quality still image from a series of interlaced video fields of the type employing local motion detection between first and third fields of the series, merging the first and second fields in areas of no motion and performing spatial interpolation on the first field in areas containing local motion, wherein the system and method are improved by removing dominant motion from the second and third fields prior to local motion detection.

The system and method of this invention utilizes motion compensation, and special attention is directed towards producing a robust method in the sense that artifacts generated by motion estimation/compensation failures are minimized. We refer to the motion field estimate obtained on the basis of a global model as the dominant motion. The method and system of the present invention is advantageous over the prior art in that it is capable of handling combinations of dominant and local image motion while avoiding complex computation.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
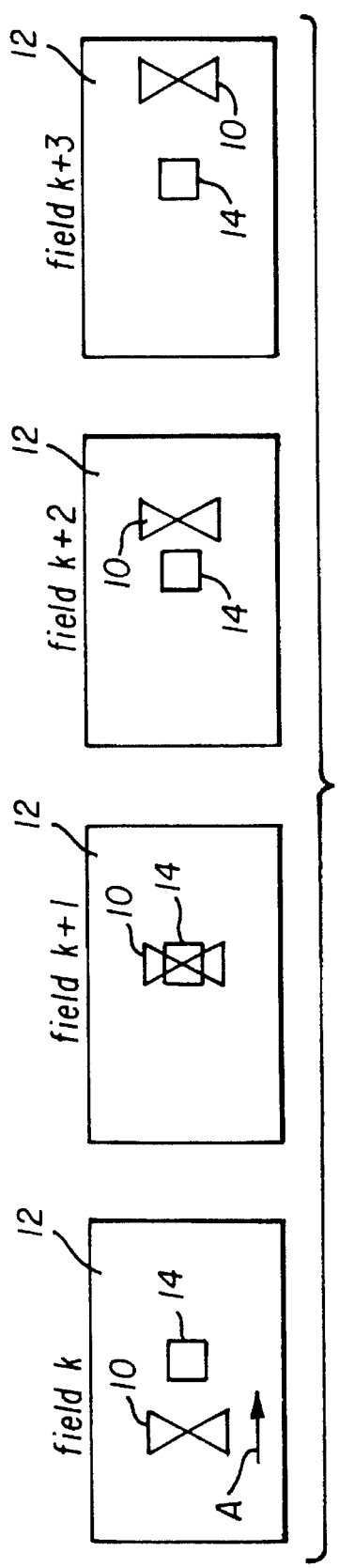
FIG. 1 shows the prior art methods of detecting motion between successive fields in a video image signal.
Figure 2:
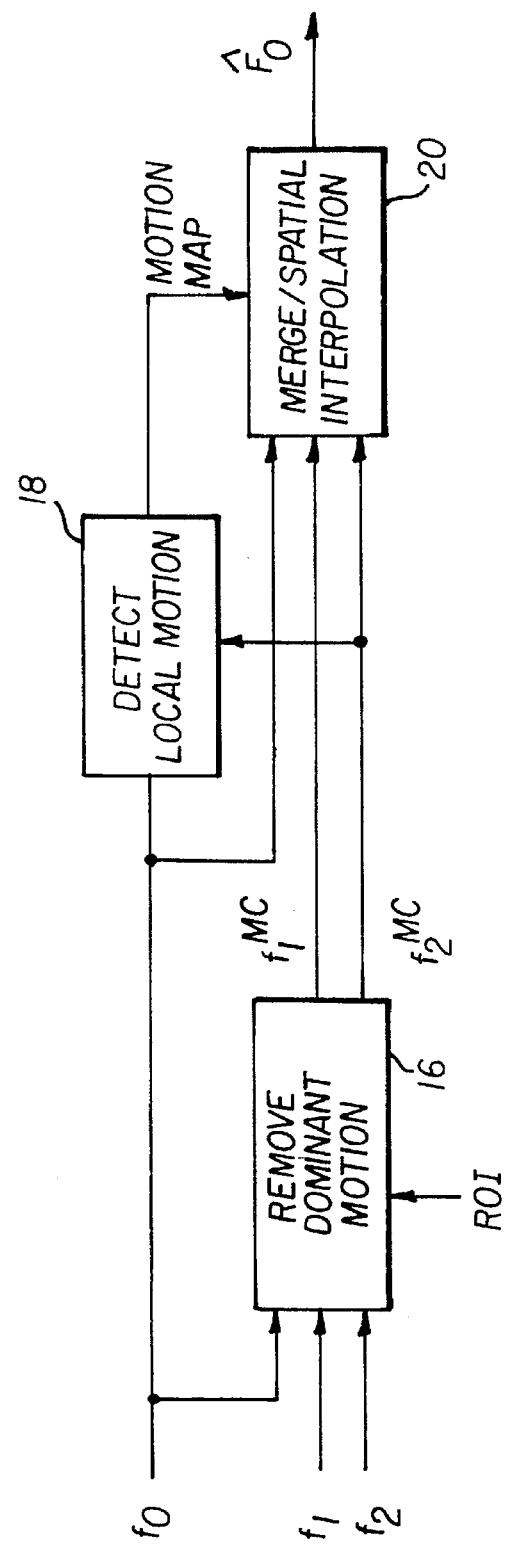
FIG. 2 is a block diagram illustrating the major steps of the invention.

Referring to FIG. 2, the method of the present invention takes three successive interlaced video fields as inputs, denoted by $f_0$, $f_1$, $f_2$ respectively, and includes three stages: (i) removing dominant motion from the video fields $f_1$, and $f_2$, to produce motion compensated second and third fields (16); (ii) detecting local motion in the fields using the first field and the third motion compensated field, (18); and (iii) merging the first field and the second motion compensated field in regions free of motion and performing spatial interpolation on regions of the first field where motion is detected (20).

In the dominant motion removal stage 16, dominant motion is estimated over a user specified region of interest (ROI), to produce the fields $f_1^{MC}$ and $f_2^{MC}$. Although the described method allows a user to choose a field of interest from video, user selection of a ROI as not a requirement that limits the usefulness of the method of the present invention. The ROI may be chosen to represent a region in $f_0$ where there is global motion. Note that it is possible to choose the ROI as the entire field, at the cost of increased computation. The local motion detection stage 18 follows, where motion detection is performed to detect regions of video moving with motions that are different from the dominant motion removed in the previous stage 16. The local motion detector uses thresholding and is adaptive in the sense that the thresholding operation adapts to the scene contents as described in detail below. The output of the motion detection stage 18 is a binary motion/no motion decision map, which is used in the last processing stage 20.

Figure 3:
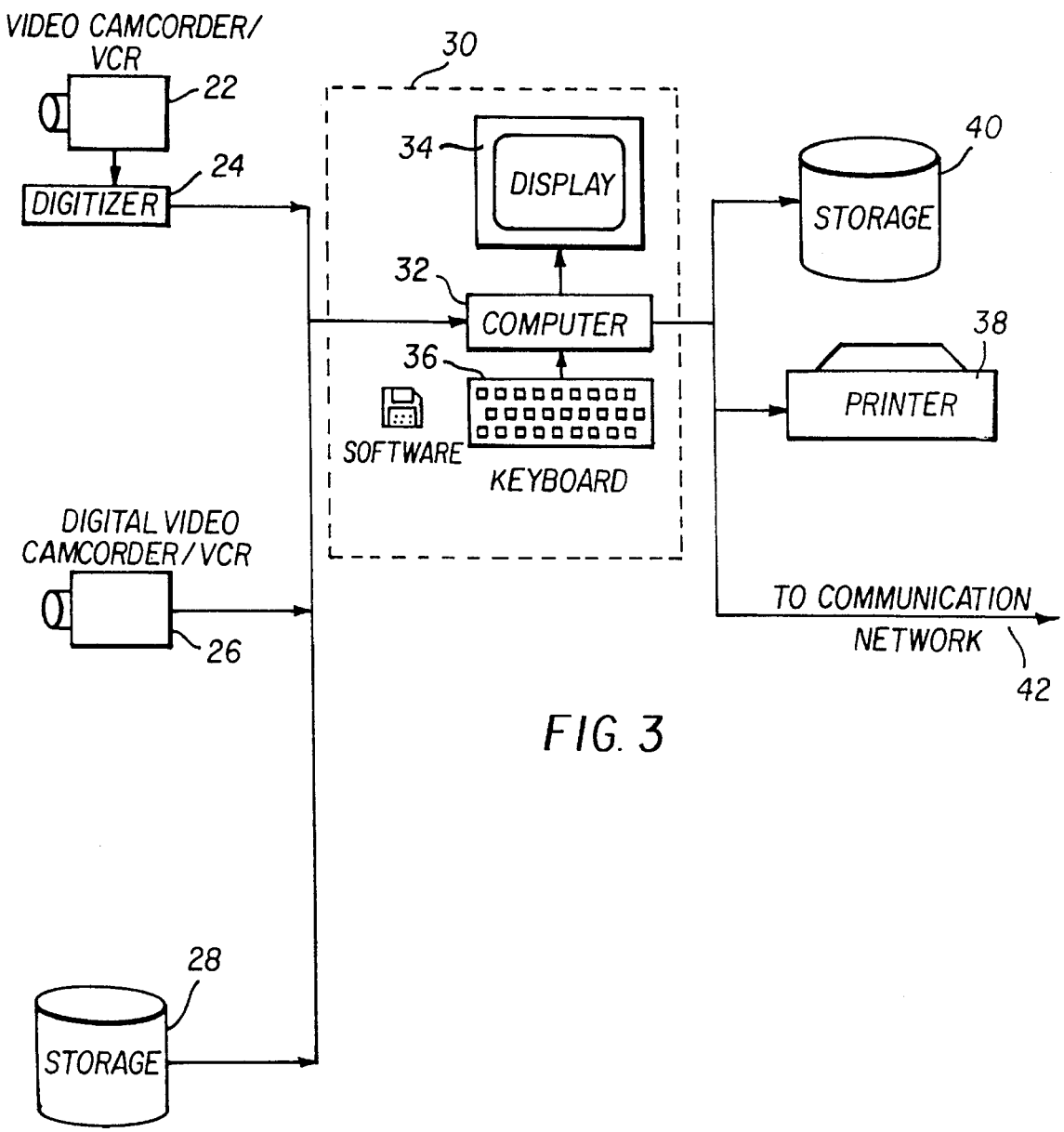
FIG. 3 is a schematic diagram depicting a system suitable for implementing the present invention.

Referring to FIG. 3, a system useful in practicing the present invention is shown. Input devices such as a video camcorder/VCR 22 connected to a digitizer 24, a digital video camcorder 26, or a disk storage 28 provide a source of a video sequence of digital fields. The video sequence of digital fields is then supplied to an image processing computer system 30 that contains a computer 32 such as a Power PC, a CRT display 34 having typically SVGA or better resolution, and an operator input device 36 such as a keyboard or a mouse. The computer is connected to an output device such as: a printer 38 for creating a hard copy display of the high-quality still image; a storage medium 40, such as an optical disk, for storage pending eventual display of the image; or link 42 to a communication network for distributing the high-quality still image. The three major stages of the present invention are explained in detail in the following.

Remove Dominant Motion

This stage begins by taking the input fields $f_0$, $f_1$, and computing the corresponding frames $F_0^L$, $F_1^L$, and $F_2^L$, using spatial vertical linear interpolation. This is depicted as linear interpolators 44 in the block diagram of FIG. 4. Motion is then estimated by motion estimators 46 between the frame pairs $F_0^L$, $F_1^L$, and $F_0^L$, $F_2^L$. Note that we do not assume constant-velocity, linear-trajectory motion. This is because when the dominant-motion is caused by camera jitter the linear motion assumption would be violated. The global motion is modeled using an affine transformation relating the frames as $$f_1^L(x,y) = F_0^L(x+c1c2x+c3y, y+c4+c5x+c6y), \quad (1)$$

and the motion estimation requires estimating the parameters c1–c6 over the ROI. To accomplish this estimation, we use the method discussed in Bergen et. al. "A three-frame algorithm for estimating two-component image motion," IEEE Trans. Pattern Anal. Mach. Intel., Vol. 14, pp. 886–896, 1992, which enforces a continuous optical flow constraint, and solves a least squares problem expressed in terms of the Taylor series expansion of the video signal $f(x,y,t)$. In this method, the frames $F_0^L$, $F_1^L$, and $F_2^L$ are pre-blurred substantially since spatial derivatives must be estimated. We have found a uniform blur with a 13×13 support to be effective. Additionally, because the Taylor series expansion assumes a small motion, the algorithm is used iteratively.

Figure 4:
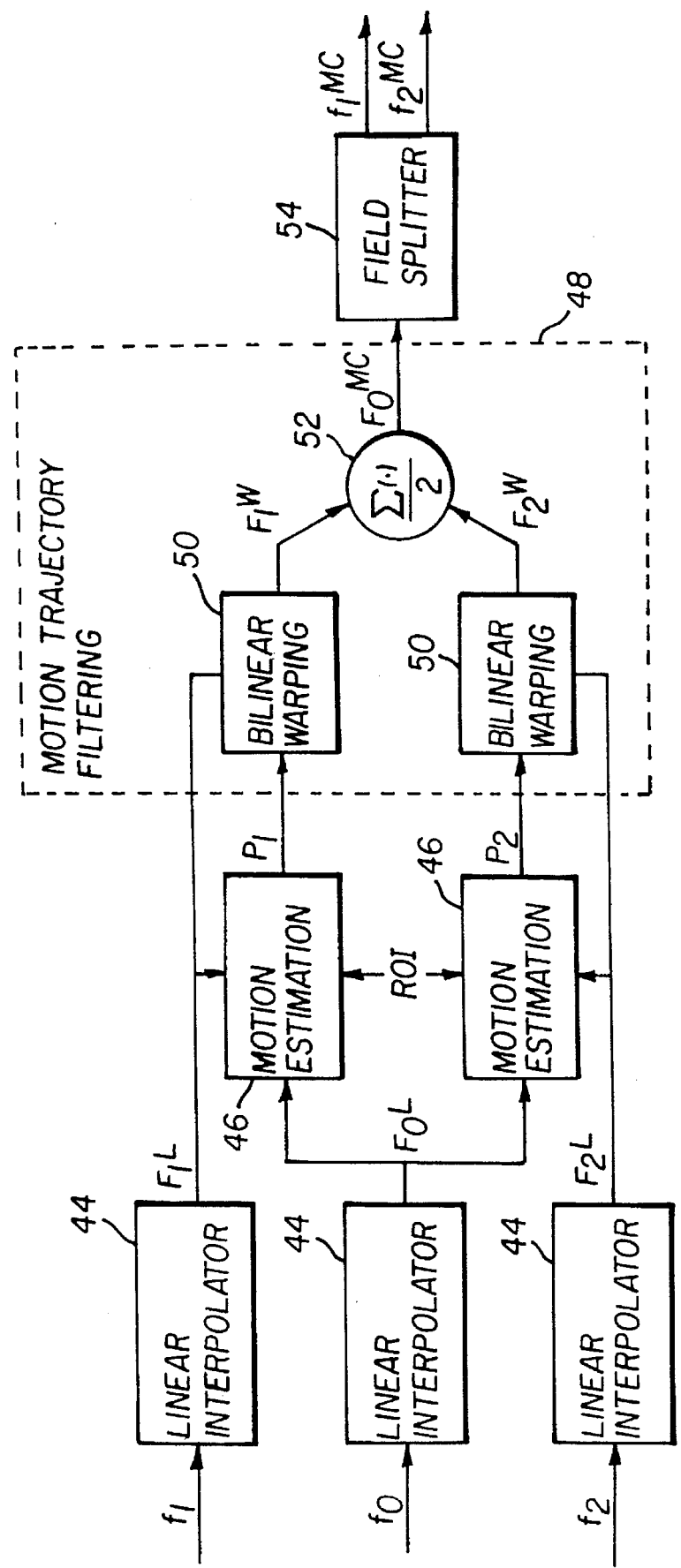
FIG. 4 is a detailed block diagram showing the dominant-motion compensated filtering employed in the present invention.

Given the motion parameter sets denoted by P1 and P2 in FIG. 4 corresponding to motion between $F_0^L$ and $F_1^L$, and $F_0^L$, and $F_2^L$, respectively, motion trajectory filtering 48 is used to compute the motion compensated fields $f_1^{MC}$ and $f_2^{MC}$. Frames, $F_1^L$ and $F_2^L$ are warped 50 using bilinear spatial interpolation to form frames $F_1^W$ and $F_2^W$, both of which are estimates of the frame $F_0$. Frames $F_1^W$ and $F_2^W$ are then temporally averaged 52 to produce the frame $\hat{F}_0^{MC}$, which is the motion compensated estimate of $F_0$. Finally the frame $\hat{F}_0^{MC}$ is split 54 into an odd and even fields $f_1^{MC}$ and $f_2^{MC}$.

Detect Local Motion

We use the fields $f_0$ and $f_2^{MC}$ to perform motion detection. The motion detection strategy we employ is to compute the summed absolute difference (SAD) over appropriate regions in these two fields, and then apply a thresholding scheme. For example, if we denote the SAD value for the missing pixel location at (n1,n2–1) at time index k as $S_k(n1,n2-1)$, then the SAD computed over a 3×3 window is given by $$S_k(n1,n2-1) = \sum_{m1=-1}^{1} \sum_{m2=-1}^{1} |\tilde{f}_0^{MC}(n1+m1, n2+2m2, k) - \tilde{f}_2^{MC}(n1+m1, n2+2m2, k+2)| \quad (2)$$

where $\tilde{f}_0^{MC}(n1, n2k)$ and $\tilde{f}_2^{MC}(n1, n2k)$ represent the corresponding continuous fields sampled over a progressive lattice. If $S_k(n1, n2-1)$ is larger than a threshold, then motion is detected and a "1" is entered to the corresponding location of the motion detection map array. Otherwise, motion is decided to be not present and a "0" is entered at the corresponding location in the motion detection map. In the following, we describe the method for selecting a dynamic threshold that is spatially adaptive.

Figure 5:
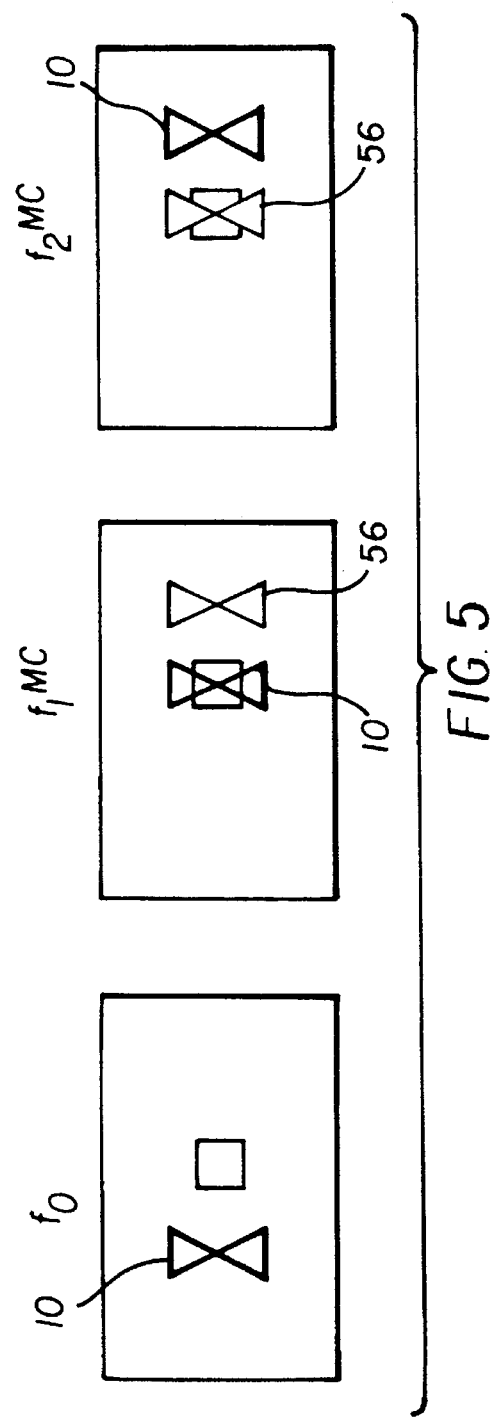
FIG. 5 shows a series of fields demonstrating ghosting when detecting motion in dominant-motion compensated fields.

To begin, we note that as a result of the motion compensation step, the dominant motion has already been removed, and motion detection applied between the fields $f_0$ and $f_2^{MC}$ will be detecting the motion in objects moving independently from the dominant motion. Because of the global motion assumption made during filtering along the motion trajectory in the motion compensation stage, there will actually be a motion "ghost" present in the field $f_2^{MC}$. As shown in FIG. 5, the motion ghost 56 of the small object 10 appears in fields $f_1^{MC}$ and $f_2^{MC}$. The ghosting has the positive effect of allowing a 3-field method to detect the motion of fine-detailed objects independently moving against a uniform background, while only comparing a single pair of fields, since the ghost will be present for motion detection. However, the intensity difference between the background and the ghost is now reduced by a factor of two, due to averaging, compared to the intensity difference between the object itself and the background. Thus, a small threshold is required for detection of motion. The problem now is that if the comparison threshold is set too low, motion will be falsely detected around sharp edges that have undergone global motion but not perfectly compensated for due to inaccuracies in the dominant-motion estimation. To address this problem, we use adaptive thresholding, as explained below.

The following two observations constrain the design of an adaptive thresholding scheme. First, the motion detection errors will give rise to artifacts, and these will be most noticeable in image regions of low local variance, especially when no motion is detected. Therefore, in regions of low variance, the comparison threshold used in motion detection should be low, especially for accurate detection of ghosts. Second, in regions of high variance, artifacts due to motion detection will be less noticeable. Additionally, when compared to deinterlacing via an intrafield technique, it is in the regions of higher variance that motion compensated filtering will produce the greatest increase in resolution, and the greatest reduction in aliasing. Therefore, in regions of higher variance the motion detection threshold should be high. This will also provide an implicit tolerance to errors in dominant-motion estimation at such regions, the benefits of such tolerance have been discussed above. The proposed motion detection scheme depicted in FIG. 6 has these properties.

Figure 6:
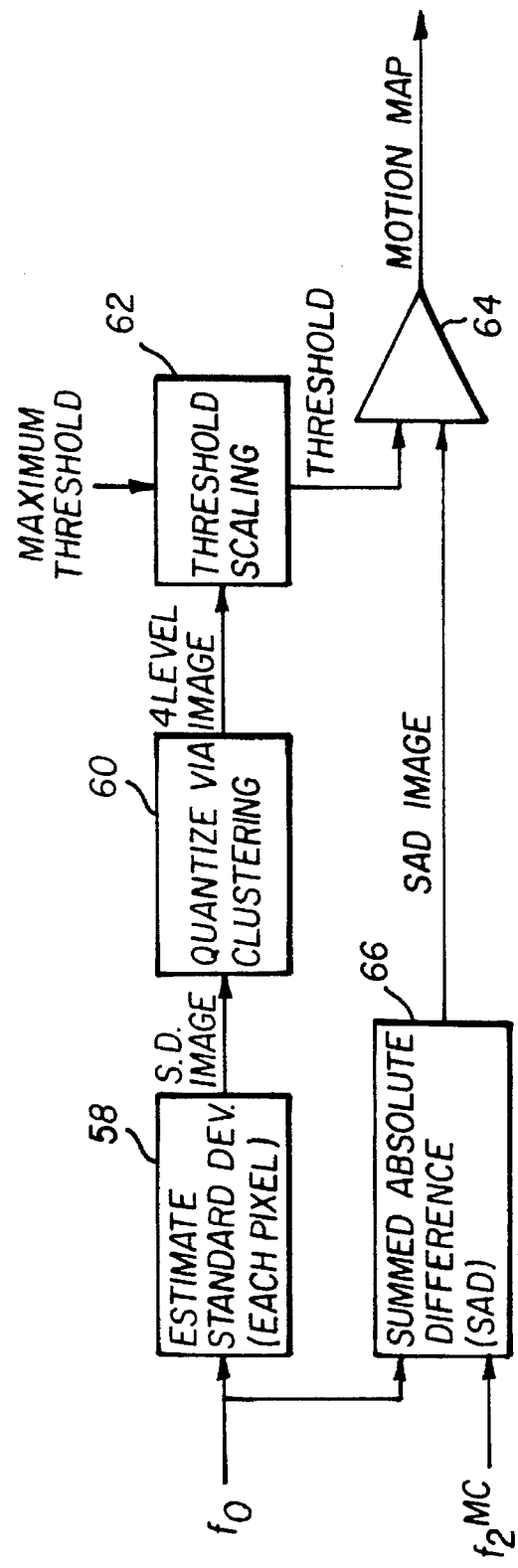
FIG. 6 shows a detailed block diagram of adaptive motion detection as employed in the present invention.

In reference to FIG. 6, the first step in the motion detection is to locally estimate 58 a sample standard deviation of field $f_0$ at every pixel over a 3×3 region, where the pixels lie at the centers of the 3×3 windows. The result is a 2-D array, i.e., an image of standard deviation values (S.D. image). To spatially adapt the threshold to the S.D. image, but remove dependency on abnormally high values for standard deviation, the S.D. image is dynamically quantized 60 into four levels using for example the well known k-means clustering algorithm with k=4 (see J. S. Lim, Two-Dimensional Signal and Image Processing, Prentice Hall, 1990, page 607). The four-level standard deviation image output from the dynamic quantization process is then normalized to the interval [0,1], and used to scale a user specified maximum threshold 62. This results in four thresholds that adapt to regions of lower and higher variance. Each pixel location is assigned to one of these four thresholds. The regions of the largest quantized standard deviation use the specified maximum threshold, and as the standard deviation decreases in the remaining three quantization levels so does the threshold. These thresholds are then applied 64 to the image of SAD values computed 66 between $f_0$ and $f_2^{MC}$, to produce the output motion detection map. We have obtained very good performance when we set the maximum threshold to 20, in case of numerous test images.

Merge/Interpolate

This stage of the present invention creates the final deinterlaced image $\hat{F}_0$, on the basis of the motion detection map. For the even lines, the lines of $f_0$ are copied to form the even lines of $\hat{F}_0$. For the odd lines of $\hat{F}_0$, the motion map from the motion detection stage is used to decide whether to replace the missing pixels in $f_0$ by merging pixels from $f_1^{MC}$ (compensated pixels), or by using intrafield interpolation (non-compensated pixels). The intrafield interpolation algorithm we propose is an extension of Isnardi's directional interpolation method, where we have incorporated a mechanism for reducing artifacts at areas where contours are not correctly identified.

A straightforward method of detecting the direction of a contour is to compare the SAD over windows which pivot about the pixel to be interpolated. For example, a 3 pixels by one (3×1) line window would produce a SAD for the direction m denoted by $S_m$, as $$S_m = \sum_{l=-1}^{1} |f_p(n1 + m + l, n2 - 1, k) - f_p(n1 - m + l, n2 + 1, k)|. \quad (3)$$

The values of $S_m$ are computed for some predetermined range of slopes m=−α, . . . , α, and the direction m over which $S_m$ is a minimum is the slope chosen for directional interpolation. To test for fractional slopes, the image lines can be upsampled in the horizontal direction, and the algorithm can be applied to the upsampled image.

When the slope m is not correctly estimated, artifacts will result. These artifacts occur in regions of fine detail where a well defined contour does not exist. This occurs because the SAD values for each test window pair are resulting in values that are random. As such, the directional choice becomes random. A remedy for this problem is to detect the presence of a well-defined contour, and only use directional interpolation when such a contour is found. A simple but effective means of performing this task is to scale the SAD value for the vertical direction, $S_0$, by a factor between 0 and 1, so that the decision is biased towards using vertical interpolation. Then, if there is well-defined contour, vertical interpolation is used, but if there is a contour, directional interpolation is used. It has been experimentally determined that the multiplying factor of 0.6 yields a good compromise between detecting the presence of a well defined contour, and providing a satisfactory estimate of the contour direction. We have obtained excellent results with numerous images when SAD is computed over 7×3 windows, and m=2 with slopes computed at 0.5 pixel intervals.

A computer program written in the C++ language for operation on a Unix based workstation such as a Sun workstation for implementing the method of the present invention is provided herewith as a microfiche appendix. Part 1 of the appendix is a program for implementing the dominant motion removal portion of the present invention, and part 2 of the appendix is a program for implementing the local motion detection and merge/spatial interpolation portions of the present invention.

The present invention can be applied to multispectral (i.e., color) video as follows. Given the three-channel color video, represented by red, green and blue (R,G,B) channels, a transformation is applied to transform it to a luminance-chrominance space, such as (Y,U,V), where Y denotes the luminance and U and V denote the associated chroma channels. Dominant motion estimation is performed on the luminance channel. The estimated motion is then used in processing red, green and blue channels, separately, according to the invention, to generate the resulting high-quality, color still image.

The invention has been described with reference to a preferred embodiment. However, it will be appreciated that variations and modifications can be effected by a person of ordinary skill in the art without departing from the scope of the invention.

| PARTS LIST | |
|---|---|
| 10 | small object |
| 12 | background |
| 14 | region of interest |
| 16 | remove dominant motion step |
| 18 | detect local motion step |
| 20 | merge/spatial interpolation step |
| 22 | video camcorder/VCR |
| 24 | video digitizer |
| 26 | digital video camcorder/VCR |
| 28 | storage disc |
| 30 | computer system |
| 32 | computer |
| 34 | display |
| 36 | keyboard |
| 38 | printer |
| 40 | storage disc |
| 42 | link to communication network |
| 44 | linear interpolator |
| 46 | motion estimation step |
| 48 | motion trajectory filtering step |
| 50 | bilinear warping |
| 52 | averaging step |
| 54 | field splitting step |
| 56 | motion ghost |
| 58 | estimate standard deviation step |
| 60 | quantize using clustering step |
| 62 | threshold scaling |
| 64 | comparison with threshold step |
| 66 | computation of SAD |

We claim:

1. A method for creating a high quality still image from a series of three interlaced video fields, comprising the steps of:
   a) removing dominant motion from the second and third fields relative to the first field to produce dominant motion compensated second and third fields;
   b) detecting local motion between areas in the first field and corresponding areas in the dominant motion compensated third field to produce a motion/no motion decision map; and
   c) using the decision map, merging the first field and the motion compensated second field in areas of no local motion and performing spatial interpolation on the first field in areas containing local motion.

2. The improved method claimed in claim 1, wherein the spatial interpolation is contour sensitive spatial interpolation.

3. The improved method claimed in claim 1, wherein the local motion detection employs an adaptive dynamic threshold.

4. The improved method claimed in claim 1, wherein the method is applied to a designated region of interest in an image.

5. A method for creating a high quality still image from a series of three successive interlaced video fields, comprising the steps of:
   a. interpolating each field in the series to a full frame to produce a series of interpolated fields;
   b. estimating the dominant motion of the scene between the first interpolated field and the second and third interpolated fields using a global motion model;
   c. compensating for the estimated dominant motion in the second and third interpolated fields by warping the second and third interpolated fields to align them with the first interpolated field;
   d. averaging the second and third warped interpolated fields to provide an averaged dominant motion compensated interpolated field;

e. splitting the averaged motion compensated interpolated field to form second and third averaged dominant motion compensated fields;

f. detecting local motion between objects in the first field and the third averaged dominant motion compensated field; and g. merging the first field and the second averaged dominant motion compensated field in regions of the image that are free of local motion, and performing contour sensitive spatial interpolation on the first field in areas containing local motion.

6. The method for creating a high quality still image claimed in claim 5, further comprising the steps of:

a. designating a region of interest in the image for performing the method; and b. performing the method steps on the designated region of interest.

7. A system for creating a high quality still image from a series of three interlaced video fields, comprising:

a. means for removing dominant motion from the second and third fields to produce dominant motion compensated second and third fields;

b. means for detecting local motion between the first field and the third dominant motion compensated field; and c. means for merging the first field and the second dominant motion compensated field in areas of no motion and performing spatial interpolation on the first field in areas containing local motion.

8. The system claimed in claim 7, wherein the means for performing spatial interpolation employs contour sensitive spatial interpolation.

9. The system claimed in claim 7, wherein the means for local motion detection employs an adaptive dynamic threshold.

10. A system for creating a high quality still image from a series of three successive interlaced video fields, comprising:

a. means for interpolating each field in the series to a full frame to produced a series of interpolated fields;

b. means for estimating the dominant motion of the scene between the first interpolated field and the second and third interpolated fields using a global motion model;

c. means for compensating for the estimated dominant motion in the second and third interpolated fields by warping the second and third interpolated fields to align them with the first interpolated field;

d. means for averaging the second and third warped interpolated fields to provide an averaged dominant motion compensated interpolated field;

e. means for splitting the averaged motion compensated interpolated field to form second and third averaged dominant motion compensated fields;

f. detecting local motion between objects in the first field and the third averaged dominant motion compensated field; and g. means for merging the first field and the second averaged dominant motion compensated field in regions of the image that are free of local motion, and performing contour sensitive spatial interpolation on the first field in areas containing local motion to produce the high quality still image.

\* \* \* \* \*